(12) United States Patent
Mita et al.

(10) Patent No.: US 6,932,651 B2
(45) Date of Patent: Aug. 23, 2005

(54) CONNECTING STRUCTURE FOR ELECTRIC CELLS

(75) Inventors: Yoshinori Mita, Saitama (JP); Kazuo Ando, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/941,830

(22) Filed: Sep. 16, 2004

(65) Prior Publication Data

US 2005/0070164 A1 Mar. 31, 2005

(30) Foreign Application Priority Data

Sep. 16, 2003 (JP) .................................... P.2003-322723
Sep. 18, 2003 (JP) .................................... P.2003-326170

(51) Int. Cl.$^7$ ............................................. H01R 33/00
(52) U.S. Cl. ..................... 439/627; 429/99; 439/500
(58) Field of Search ............................... 439/627, 500; 429/97–100

(56) References Cited

U.S. PATENT DOCUMENTS

| | | | | |
|---|---|---|---|---|
| 3,846,971 A | * | 11/1974 | Ho et al. ...................... 368/88 |
| 3,941,618 A | * | 3/1976 | Mabuchi ...................... 429/99 |
| 3,956,019 A | * | 5/1976 | Mabuchi et al. .............. 429/99 |
| 3,992,225 A | * | 11/1976 | Sykes ........................... 429/1 |
| 4,065,710 A | * | 12/1977 | Zytka .......................... 320/103 |
| 4,205,121 A | * | 5/1980 | Naitoh ........................ 429/99 |
| 4,576,880 A | * | 3/1986 | Verdier et al. ................ 429/99 |
| 4,595,641 A | * | 6/1986 | Giurtino ........................ 429/1 |
| 4,737,420 A | * | 4/1988 | Ikeda et al. .................... 429/1 |
| 5,296,314 A | * | 3/1994 | Millauer et al. .............. 429/99 |
| 5,725,396 A | * | 3/1998 | Stocchiero .................. 439/627 |
| 5,853,915 A | * | 12/1998 | Suto ............................ 429/99 |
| 5,895,490 A | * | 4/1999 | Ramsey ...................... 711/144 |
| 6,187,470 B1 | * | 2/2001 | Peterson ....................... 429/99 |
| 6,211,645 B1 | * | 4/2001 | Kouzu et al. ................ 320/107 |
| 6,287,150 B1 | * | 9/2001 | Oda et al. ................... 439/627 |
| 6,303,248 B1 | * | 10/2001 | Peterson ..................... 429/177 |
| 6,328,604 B1 | * | 12/2001 | Inoue et al. ................. 439/627 |
| 6,379,837 B1 | * | 4/2002 | Takahashi et al. .......... 429/151 |
| 6,558,835 B1 | * | 5/2003 | Kurisu et al. ............... 429/159 |
| 6,582,848 B2 | * | 6/2003 | Peterson ....................... 429/99 |
| 6,627,345 B1 | * | 9/2003 | Zemlok et al. ............... 429/99 |
| 6,641,432 B1 | * | 11/2003 | Ouyoung .................... 439/500 |
| 6,673,485 B2 | * | 1/2004 | Kimura et al. ................ 429/99 |
| 6,773,301 B1 | * | 8/2004 | Chaskin ..................... 439/500 |

FOREIGN PATENT DOCUMENTS

| JP | 2000-268793 | 9/2000 |
|---|---|---|
| JP | 3312853 | 5/2002 |
| JP | 2003-162993 | 6/2003 |

* cited by examiner

*Primary Examiner*—Ross Gushi
*Assistant Examiner*—Larisa Tsukerman
(74) *Attorney, Agent, or Firm*—Arent Fox, PLLC.

(57) ABSTRACT

A connecting bus bar 12 is formed from a negative opposing section 27 which is smaller in thickness than a closed end of a bottomed cylinder 13, partially has a negative weld plate section 27a to be welded to the closed end of a bottomed cylinder 13, and opposes the closed end of the bottomed cylinder 13; a positive opposing section 28 which is smaller in thickness than a seal plate 14, partially has a positive weld plate section 28a to be welded to the seal plate 14, and opposes the seal plates 14; and the coupling section 29 for connecting together the negative opposing section 27 and the positive opposing section 28. The connecting bus bar 12 is formed such that the connecting bus bar 12, which excludes the negative weld plate section 27a and the positive weld plate section 28a, becomes lower in thickness than a thinner one of the closed end of the bottomed cylinder 13 and the seal plate 14.

6 Claims, 12 Drawing Sheets

CONNECTING STRUCTURE FOR ELECTRIC CELLS

This application claims foreign priorities based on Japanese Patent applications No. 2003-322723 and No. 2003-326170, filed Sep. 16, 2003 and Sep. 18, 2003, respectively, the contents of which are incorporated herein by reference in their entirety.

BACKGROUND OF THE INVENTION

1. Field of the Invention

The present invention relates to a structure for connecting electric cells (often referred to as an "electric-cell connecting structure"), and more particularly to an improvement in a structure for connecting electric cells, wherein a pair of electric cells, each having a bottomed cylinder of a negative electrode and a seal plate of a positive electrode attached to an open end portion of the bottomed cylinder in such a manner as to seal the open end of the bottomed cylinder, are connected together by way of a connecting bus bar to be welded to a closed end of the bottomed cylinder and to the other seal plates of both electric cells, or by way of a connecting ring.

2. Description of the Related Art

The following connecting structure has already been known such as disclosed in JP-A-2003-162993, wherein, when a pair of electric cells disposed in parallel to each other, are connected together, both end sections of a connecting bus bar are welded to a negative terminal of one of the electric cells and to a positive terminal of both electric cells.

In the above-described connecting structure, a pair of electric cells are connected through use of a connecting bus bar entirely having a uniform thickness. Under the situation in which the connecting bus bar is formed from a metal plate which is thicker than a closed end and a seal plate of a bottomed cylinder of an electric cell, when an external force is applied in such a manner as to pull off the connecting ring from the electric cell, the electric cell will be fractured. Therefore, the connecting bus bar must be thinner than a section of the electric cell to which the connecting ring is welded.

Meanwhile, when the thickness of the entire connecting ring is decreased, connection resistance is increased. In this case, when a large amount of current is charged or discharged from the electric cells, a drop in voltage at the connecting ring becomes large. This may result in inability to take out large electric power or heat development at the connecting bus bar responsible for heating the electric cells, which may shorten the lives of the electric cells.

In order to satisfy such contradictory desires, it is considered to weld a thin metal plate to the electric cells and connect the thin plate metals together by means of welding a thick metal plate, to thus constitute a connecting bus bar. Such a connecting bus bar involves an increase in the number of areas to be welded, which is responsible for a cost hike, and an increase in the weight of the connecting structure, as well as involving an increase in the number of components to be used for constituting the bus bar.

Further, the following connecting structure has been also known such as disclosed in Japanese Patent No. 3312853 or JP-A-2000-268793. In those connecting structures, a pair of electric cells disposed in series with each other are connected together via a connecting ring. This connecting ring integrally includes a large-diameter short cylindrical section, a first flange section, a small-diameter short cylindrical section, and a second flange section. The large-diameter short cylindrical section assumes a cylinder having one open end and is to be fitted over and welded to a surface of an outer periphery of a bottomed cylinder. The first flange section extends radially inward from the other end of the large-diameter short cylindrical section, thereby opposing an outer surface of a closed end of the bottomed cylinder. The small-diameter short cylindrical section, whose one end is connected to an inner periphery of the first flange section, extends in a direction opposite the large-diameter short cylindrical section. The second flange section extends radially inward from the other end of the small-diameter short cylindrical section, and is welded to a seal plate.

In the above-described connecting structure, a pair of electric cells are connected through use of a connecting ring entirely having a uniform thickness. Under the situation in which the connecting ring is formed from a metal plate which is thicker than a closed end and a seal plate of a bottomed cylinder of an electric cell, when an external force is applied in such a manner as to pull off the connecting ring from the electric cell, the electric cell will be fractured. Therefore, the connecting ring must be thinner than a section of the electric cell to which the connecting ring is welded.

Meanwhile, when the thickness of the entire connecting bus bar is decreased, connection resistance is increased. In this case, when a large amount of current is charged or discharged from the electric cells, a drop in voltage at the connecting bus bar becomes large. This may result in inability to take out large electric power or heat development at the connecting ring responsible for heating the electric cells, which may shorten the lives of the electric cells.

SUMMARY OF THE INVENTION

The present invention has been conceived in view of the above circumstances and provides a structure for connecting electric cells intended to reduce connection resistance through use of a connecting bus bar formed at a low cost and in a light weight while avoiding occurrence of a fracture in the electric cell.

The present invention has been also conceived in view of the above circumstances and provides a structure for connecting electric cells intended to reduce connection resistance while avoiding occurrence of a fracture in the electric cell.

In order to achieve the above-described object, the first aspect of this invention is characterized by an electric-cell connecting structure for connecting a pair of electric cells (11), being disposed in series, which are welded to a closed end of the bottomed cylinder (13) of one of the electrode cells, and to the other seal plates (14) of another electric cell (11), each electric cell having a bottomed cylinder (13) at a negative electrode side, and a seal plate (14) at a positive electrode side which is attached, by way of an insulating member (15), to an open end portion of the bottomed cylinder (13) so as to seal the open end of the bottomed cylinder (13), wherein said connecting bus bar (12) is integrally formed by a negative opposing section (27) which is smaller in plate thickness than that of the closed end of the bottomed cylinder (13) in an arrangement to be opposed each other, said negative opposing section partially including a negative weld plate section (27a) so as to be welded to the closed end of the bottomed cylinder (13); a positive opposing section (28) which is smaller in plate thickness than that of the seal plates (14) in an arrangement to be opposed each other, said positive opposing section partially including a positive weld plate section (28a) so as to be welded to the seal plate (14); and a coupling section (29) for connecting together said negative opposing section (27) and said positive opposing section (28), and further wherein the connecting bus bar (12) is formed such that a part of the connecting bus bar (12), without including said negative weld plate section (27a) and the positive weld plate section (28a), is smaller or equal in thickness than that of any one of sections of said closed end of the bottomed cylinder (13) and the seal plates (14) which has a thinner thickness thereof.

In addition to including the configuration of the first aspect of this invention, the second aspect of this invention is characterized in that the negative weld plate section and the positive weld plate section is protrusively provided with projections for protrusive welding purpose.

In addition to including the configuration of the above mentioned aspects of this invention, the third aspect of this invention is characterized in that the coupling section is formed so as to become smaller in thickness than the negative opposing section exclusive of the negative weld plate section and the positive opposing section exclusive of the positive weld plate section.

In addition to including the configuration of the third aspect of this invention, the fourth aspect of this invention is characterized in that the coupling section is formed into a substantially-U-shaped form.

To achieve the above object, the fifth aspect of this invention provides an electric-cell connecting structure for connecting together, via a connecting ring, a pair of electric cells disposed in series with each other, each electric cell having a bottomed cylinder of a negative electrode and a seal plate of a positive electrode attached, by way of an insulating member, to an open end portion of the bottomed cylinder so as to seal the open end of the bottomed cylinder; and the connecting ring integrally comprising a large-diameter short cylindrical section whose one end is cylindrically open and which is to be fitted over and welded to a surface of an outer periphery of the bottomed cylinder, a first flange section which extends radially inward from the other end of the large-diameter short cylindrical section and which opposes an outer surface of a closed end of the bottomed cylinder, a small-diameter short cylindrical section whose one end is continually connected to an inner periphery of the first flange section and which extends in the direction opposite the large-diameter short cylindrical section, and a second flange section which extends radially inward from the other end of the small-diameter short cylindrical section and which is welded to seal plate, wherein the connecting ring, whose at least weld sections of the large-diameter short cylindrical section to be welded to the bottomed cylinder are made thinner than the bottomed cylinder and whose at least weld sections of the second flange section to be welded to the seal plate are made thinner than the seal plate, is formed in such a manner that the connecting ring, excluding the weld sections of the cylindrical section and the weld sections of the second flange section, is greater or equal in wall thickness than or to thicker sections of the weld sections.

In the sixth aspect of this invention, projections for projection welding are disposed protrusively on weld sections of the large-diameter short cylindrical section in addition to a configuration described in the fifth aspect of this invention.

According to the invention defined in the first aspect, of the connecting bus bar, the negative weld plate section to be welded to the closed end of the bottomed cylinder of the electric cell is smaller in plate thickness than the closed end of the bottomed cylinder. Further, of the connecting bus bar, the positive weld plate section to be welded to the seal plate provided on the electric cell is lower in plate thickness than the seal plate. Therefore, even when external force which would pull off the connecting bus bar from the electric cells is applied to the connecting bus bar, the connecting bus bar is made more susceptible to damages, thereby avoiding infliction of damages to the electric cells. Moreover, the connecting bus bar, which excludes the negative weld plate section and the positive weld plate section, is formed so as to become thicker than a thinner one of the closed end and the seal plate of the bottomed cylinder. The connecting bus bar, which excludes the areas to be welded to the electric cell, is made comparatively thick, thereby suppressing electric resistance of the connecting bus bar comparatively low. As a result, even when a large amount of current is charged or discharged from the electric cells, a voltage drop developing in the connecting bus bar can be suppressed to a low level, to thus increase output. In addition, heat development in the connecting bus bar can be avoided, thereby prolonging the lives of the electric cells. The connecting bus bar is integrally formed by comprising the negative opposing section, the positive opposing section, and the coupling section. Therefore, the weight of the connecting bus bar can be cut by means of avoiding an increase in the number of components and the number of areas to be welded, thereby curtailing costs.

According to the invention defined in the second aspect, a stable welding characteristic can be ensured during welding of the projections to the connecting bus bar, whereby electric resistance of a connecting portion between the connecting ring and the electric cell can be suppressed to a low level.

According to the invention defined in the third aspect, even when external force which would pull off the connecting bus bar from the electric cells is applied to the connecting bus bar, the coupling section becomes deformed to absorb the stress. Thus, occurrence of a fracture in the connecting bus bar and the connecting section between the electric cells can be prevented effectively.

According to the invention defined in the fourth aspect, even when external force which would pull off the connecting bus bar from the electric cells is applied to the connecting bus bar, the coupling section is made more readily deformed to absorb the stress. Thus, occurrence of a fracture in the connecting bus bar and the connecting section between the electric cells can be prevented effectively.

According to the invention defined in the first aspect, of the large-diameter short cylindrical section of the connecting ring to be welded to a closed end portion of the bottomed cylinder of an electric cell, at least portions to be welded to a bottomed cylinder are thinner than the bottomed cylinder.

Further, of the second flange section of the connecting ring to be welded to the seal plate, at least portions to be welded to the seal plate are thinner than the seal plate. Therefore, even when external force which would pull off the connecting ring from the electric cells is applied to the connecting ring, the connecting ring is made more susceptible to damages, thereby avoiding infliction of damages to the electric cells. Further, the connecting ring exclusive of the weld sections of the large-diameter short cylindrical section and the second flange section is set to be greater in thickness than a thicker one of the weld sections of the large-diameter short cylindrical section and those of the second flange section. Accordingly, a thickness of the connecting ring exclusive of the weld sections to the electric cells is relatively thick, and electric resistance of the connecting ring can be suppressed to a relatively low level. As a result, even when a large amount of current is charged or discharged from the electric cells, a voltage drop developing in the connecting ring can be suppressed to a low level, to thus increase output. In addition, heat development in the connecting ring can be avoided, thereby prolonging the lives of the electric cells.

According to the invention of the second aspect, a stable welding characteristic can be ensured during protrusive welding of the large-diameter short cylindrical section of the connecting ring to the bottomed cyliner of the electric cells, whereby electric resistance of a connecting portion between the connecting ring and the electric cell can be suppressed to a low level.

DESCRIPTION OF THE PREFERRED EMBODIMENTS

Hereinafter, an embodiment of the present invention will be described by reference to the accompanied drawings.

Figure 1:
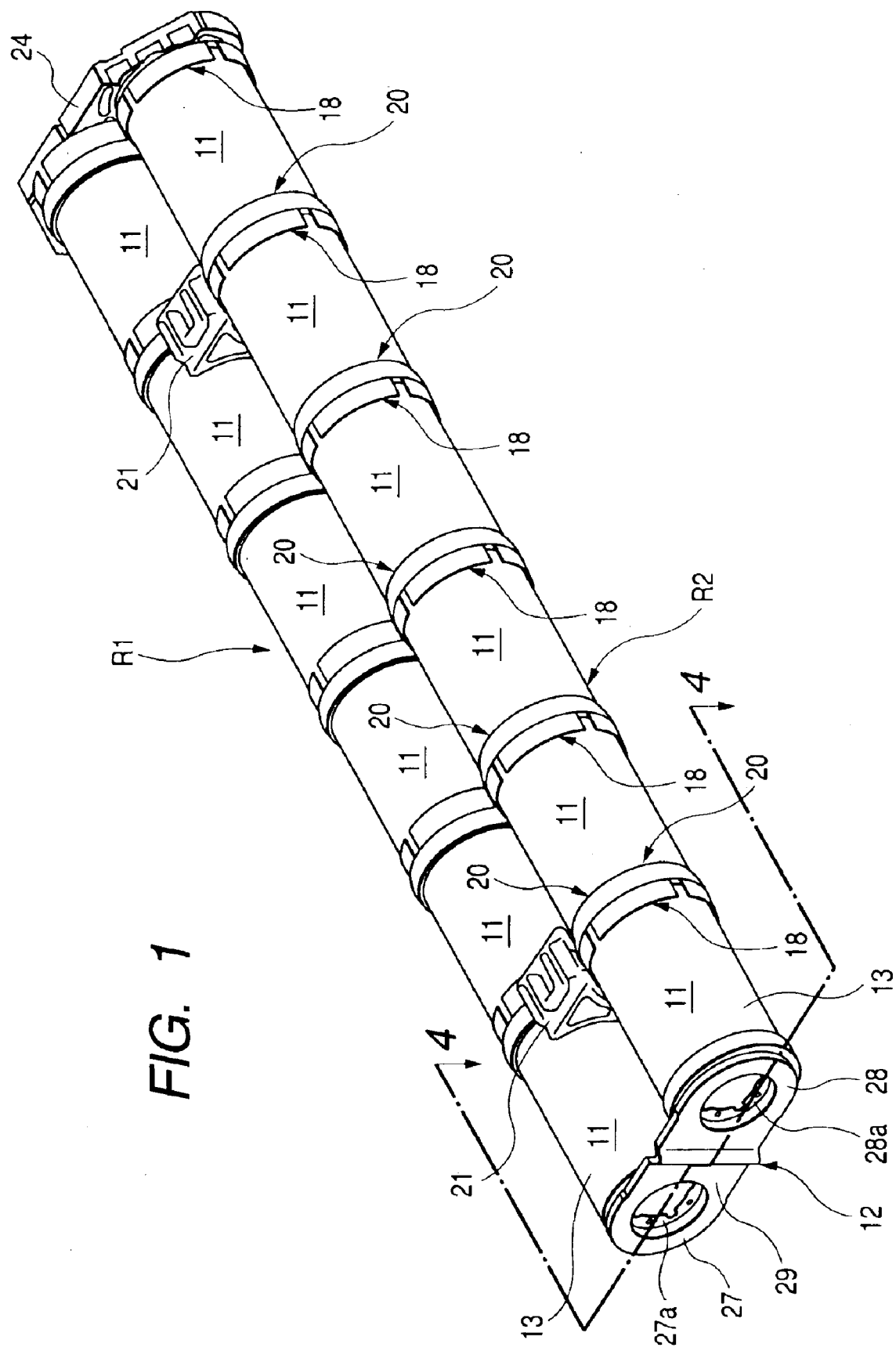
FIG. 1 is a perspective view of an electric cell module.
Figure 2:
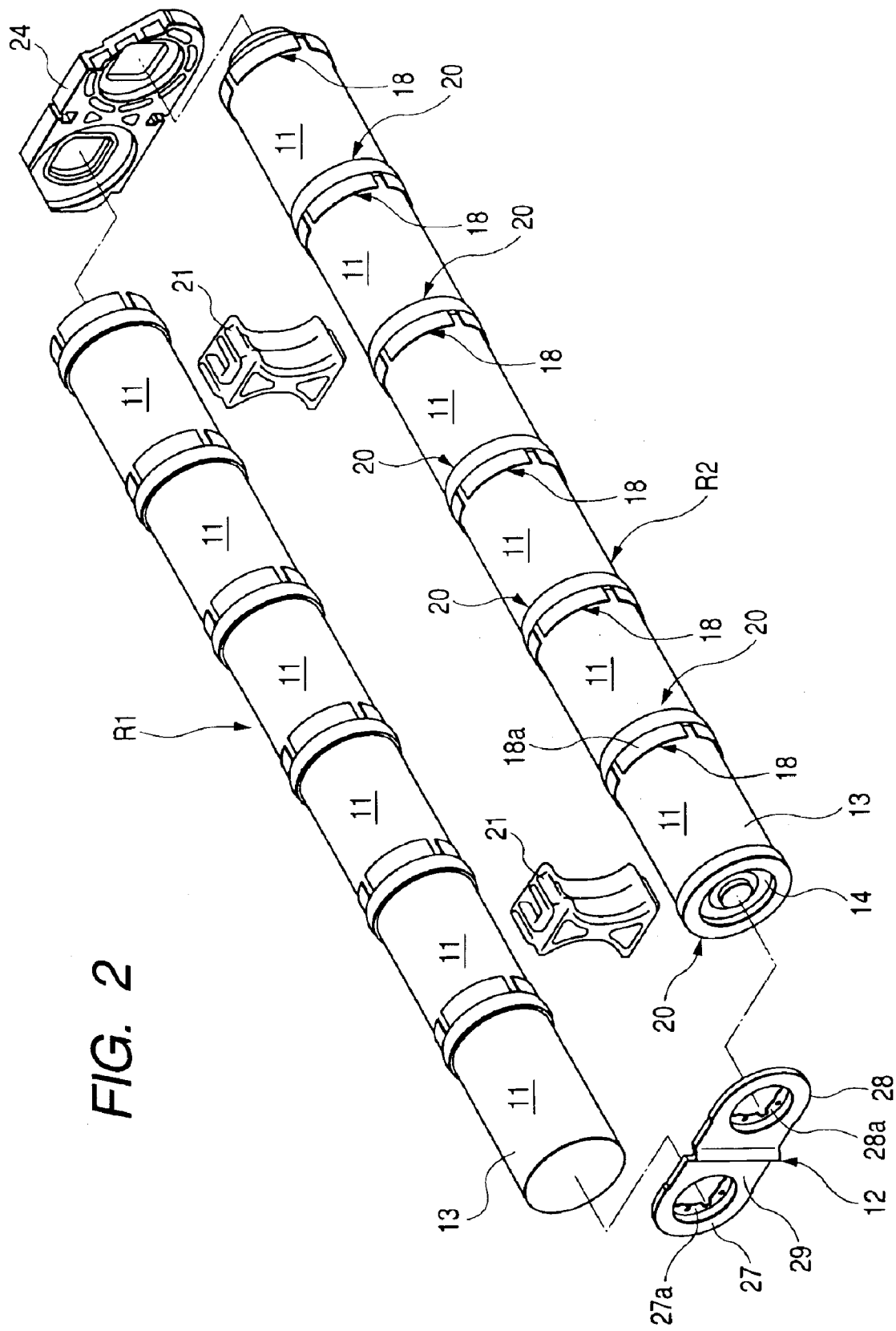
FIG. 2 is an exploded perspective view of the electric cell module.
Figure 3:
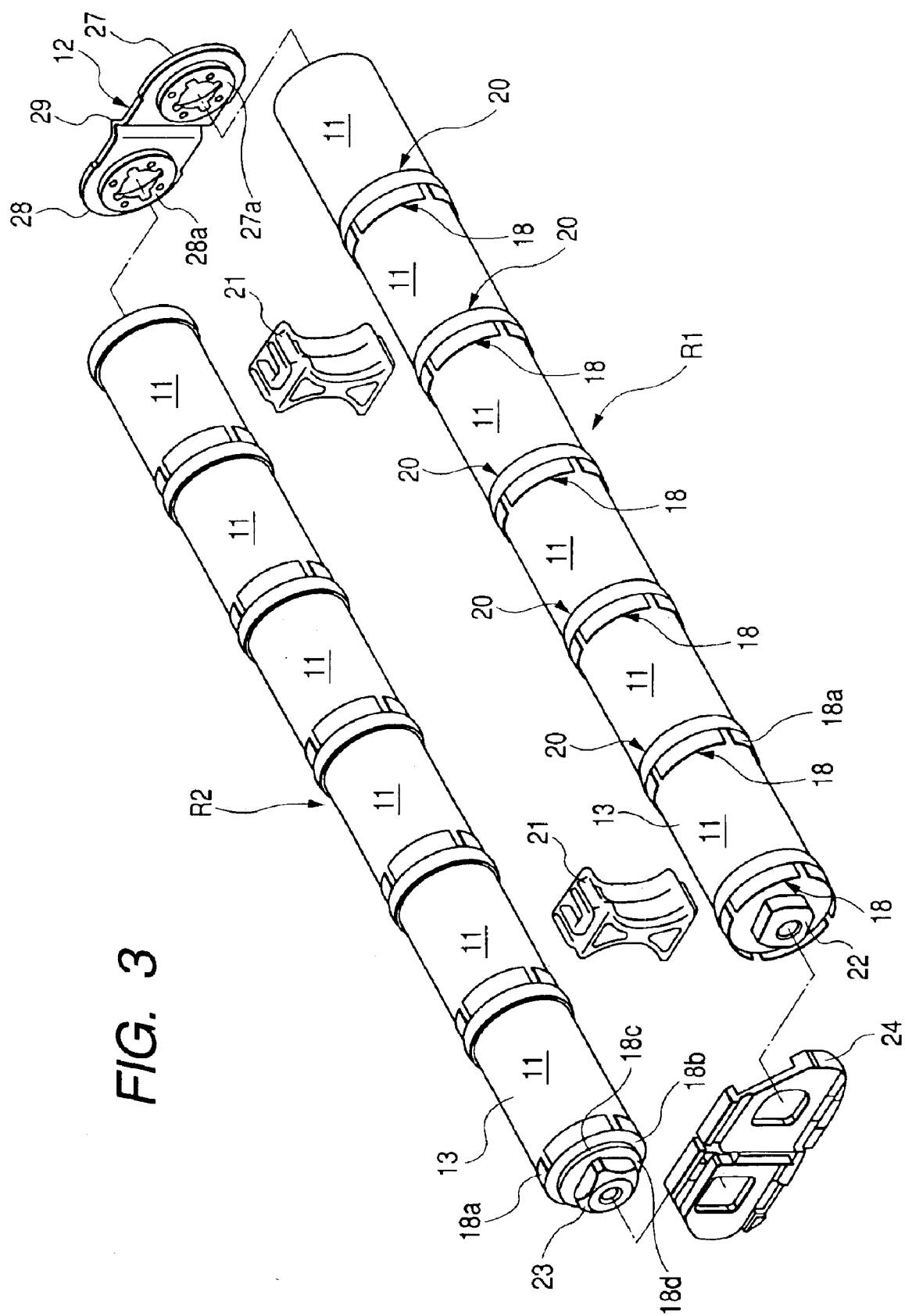
FIG. 3 is an exploded perspective view of the electric cell module when viewed in the direction opposite to that in which the electric cell module is viewed in FIG. 2.
Figure 4:
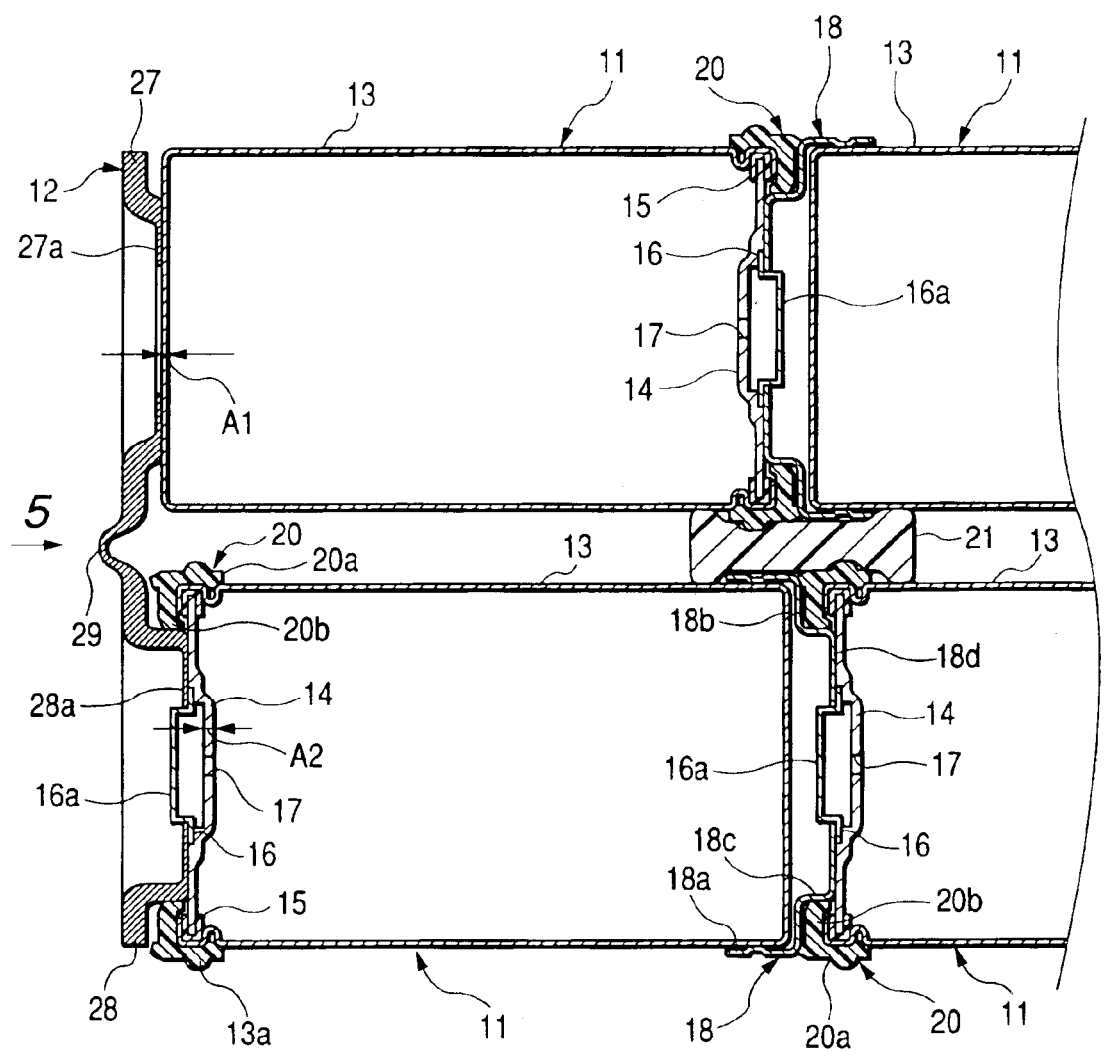
FIG. 4 is a cross-sectional view showing apart of the electric cell module along line 4—4 shown in FIG. 1.
Figure 5:
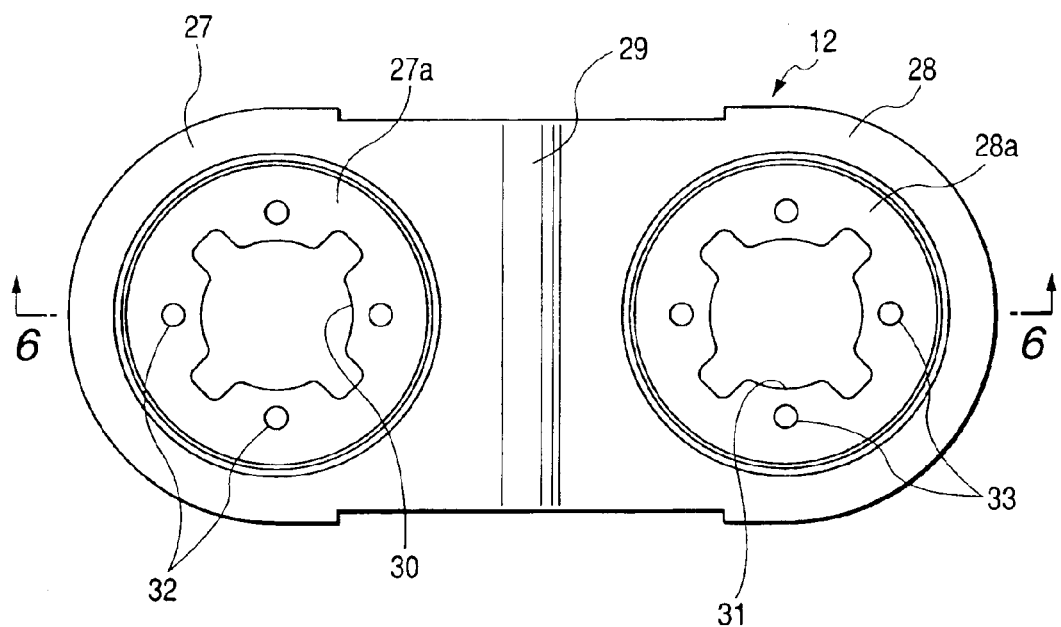
FIG. 5 is a front view of a connecting bus bar when viewed from the direction of arrow 5 in FIG. 4.
Figure 6:
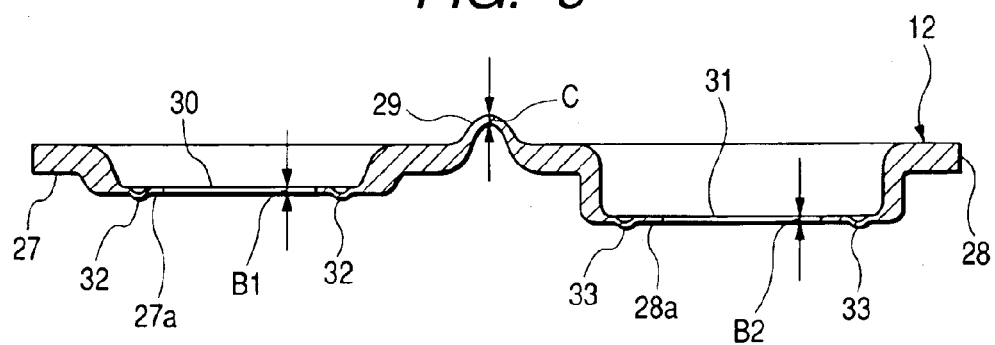
FIG. 6 is a cross-sectional view taken along line 6—6 in FIG. 5.

FIGS. 1 to 6 illustrate the first embodiment of the present invention. FIG. 1 is a perspective view of an electric cell module. FIG. 2 is an exploded perspective view of the electric cell module. FIG. 3 is an exploded perspective view of the electric cell module when viewed in the direction opposite to that in which the electric cell module is viewed in FIG. 2. FIG. 4 is a cross-sectional view showing a part of the electric cell module along line 4—4 shown in FIG. 1. FIG. 5 is a front view of a connecting bus bar when viewed from the direction of arrow 5 in FIG. 4. FIG. 6 is a cross-sectional view taken along line 6—6 in FIG. 5.

First, in FIGS. 1 to 3, this electric cell module is configured while first and second electric cell rows R1, R2, which are connected in parallel to each other, are connected in series by way of a connecting bus bar 12, wherein each of the cell rows R1, R2 is formed by connecting a plurality of electric cells 11; e.g., six electric cells 11, 11, . . . , in series to each other. The electric cell module is preferably used as a power source of an electric vehicle or a fuel-cell-powered vehicle which requires a high level of power, or as a power source of a power tool.

By reference to FIG. 4 as well, each of the electric cells 11 comprises a bottomed cylinder 13 of a negative electrode formed in uniform wall thickness so as to assume the shape of a bottomed cylinder; and a seal plate 14 of a positive electrode attached to an open end of the bottomed cylinder 13 with an insulating seal ring 15 of an insulating member interposed therebetween. The bottomed cylinder 13 is made of a conductive metal; e.g., copper, and an annular bead section 13a is formed on the open end portion thereof. The seal plate 14 is made of a conductive metal; e.g., copper, and is attached to the open end portion of the bottomed cylinder 13 such that the insulating seal ring 15 is fitted into the annular bead section 13a, to thus seal the open end of the bottomed cylinder 13. A circular protrusive section 16 which serves as a positive terminal when the electric cell 11 is used solely is welded so as to seal a through hole 17 provided in the center of the seal plate 14. Meanwhile, an internal structure of the electric cell 11 is omitted from FIG. 4.

In the first and second electric cell rows R1, R2, a connecting ring 18 formed from conductive steel or steel is welded to the bottomed cylinder 13 of one electric cell 11 and the seal plate 14 of the other electric cell 11, the electric cells 11 being adjacent to each other. The connecting ring 18 integrally comprises a large-diameter short cylindrical section 18a which is shaped into a cylinder having one open end, fitted over, and welded to a surface of an outer periphery of the bottomed cylinder 13; a first flange section 18b which extends radially inward from the other end of the large-diameter short cylindrical section 18a and which opposes an outer surface of the closed end of the bottomed cylinder 13; a small-diameter short cylindrical section 18c whose one end is connected to an inner periphery of the first flange section 18b and which extends in the direction opposite the large-diameter short cylindrical section 18a; and a second flange section 18d which extends radially inward from the other end of the small-diameter short cylindrical section 18c and which is welded to the seal plate 14. The inner periphery of the second flange section 18d forms an insertion through hole 19 which allows insertion through of the circular protruding section 16a protruding from the seal plate 14.

An insulating ring 20 is sandwiched between the two electric cells 11, 11 and performs the function of preventing occurrence of a short circuit between the positive and negative terminals of the adjacent electric cells 11, 11 in the first and second electric cell rows R1, R2, and reinforcing the connecting section between the adjacent electric cells 11, 11. The insulating ring 20 is formed from synthetic resin by integrally comprising a cylindrical section 24a for allowing an outer periphery of the open end portion of the bottomed cylinder 13 to fit therein; and a fitting flange section 24b extending radially inward from the cylindrical section 24a so as to be fitted between the first flange section 18b of the connecting ring 18 and the open end portion of the bottomed cylinder 13.

Two holders 21, 21 are interposed between the first and second electric cell rows R1, R2 for maintaining the interval between the electric cell rows R1, R2. The holders 21 are connected together by way of the insulating ring 20. Further, the holder 21 is formed from synthetic resin so as to have on both sides thereof surfaces which are to come into contact with the end portions of the adjacent electric cells 11, 11 such that the insulating ring 20 is sandwiched between the electric cells 11, 11.

The positive terminal 22 is welded to the first flange section 18b of the connecting ring 18 welded to the seal plate 14 of the electric cell 11 provided at one end with respect to the direction in which the first electric cell R1 is arranged. The negative terminal 23 is welded to the second flange section 18d of the connecting ring 18 fitted and welded to the bottomed cylinder 13 of the electric cell 11 provided at one end with respect to the direction in which the second electric cell R2 is arranged. In order to maintain the interval between the positive terminal 22 and the negative terminal 23, the positive terminal 22 and the negative terminal 23 are fitted to the terminal fixing holder 24 formed from synthetic resin.

The connecting bus bar 12 is welded to the closed end of the bottomed cylinder 13 of the battery 11 provided at the other end with respect to the direction in which the first battery cell row R1 is arranged as well as to the seal plate 14 of the electric cell 11 provided at the other end with respect to the direction in which the second battery cell row R2 is arranged. By means of this connecting bus bar, twelve electric cells 11 are connected in series such that the positive terminals 22 and the negative terminals 23 come to both ends.

In FIGS. 5 and 6, the connecting bus bar 12 formed from conductive metal or steel is formed by integrally comprising a negative opposing section 27 which partially has a negative weld plate section 27a to be welded to the closed end of the bottomed cylinder 13 and which opposes the closed end of the bottomed cylinder 13; a positive opposing section 28 which partially has a positive weld plate section 28a to be welded to the seal plate 14 and which opposes the seal plates 14; and the coupling section 29 for connecting together the negative opposing section 27 and the positive opposing section 28. The negative opposing section 27 is formed into a dish shape having the negative weld plate section 27a as a bottom, and the positive opposing section 28 is formed into a dish shape having the positive weld plate section 28a as a bottom. An opening section 30 is formed in the center of the negative weld plate section 27a, and an opening section 31 is formed in the center of the positive weld plate section 28a.

The negative weld plate section 27a is formed to assume a thickness B1 (B1<A1), e.g., 0.4 mm, which is smaller than the closed end of the bottomed cylinder 13; that is, the thickness of the bottomed cyliner 13, e.g., 0.5 mm. The positive weld plate section 28a is formed to assume a thickness B2 (B2<A2), e.g., 0.6 mm, which is smaller than the thickness A2 of the seal plate 14, e.g., 1.0 mm. The minimum thickness C of the connecting bus bar 12 is set so as to become greater than a thinner one of the closed end of the bottomed cylinder 13 and the seal plate 14. In the present embodiment, the thickness A1 of the closed end of the bottomed cylinder 13 is smaller than the thickness A2 of the seal plate 14. Therefore, the minimum thickness C is set so as to become larger than the thickness A1 of the closed end of the bottomed cylinder 13; e.g., 0.6 mm.

Moreover, the portion of the connecting bus bar 12 assuming the minimum thickness C is the coupling section 29. This coupling section 29 is made thinner than the negative opposing section 27 exclusive of the negative weld plate section 27a and the positive opposing section 28 exclusive of the positive weld plate section 28a, and is formed into an essentially-U-shaped pattern which protrudes in a direction opposite the two electric cells 11.

The thickness of the connecting bus bar 12, which excludes the negative weld plate section 27a and the coupling section 29, is set to the maximum-possible size in order to suppress electric resistance. The maximum thickness of the connecting bus bar 12, which excludes the negative weld plate section 27a, the positive weld plate section 28a, and the coupling section 28, is set to, e.g., 2.0 mm.

The negative weld plate section 27a and the positive weld plate section 28a are protrusively provided in plural numbers, e.g., four, on the respective projections 32 . . . , 33 . . . , for protrusive welding purpose.

Operation of the connecting structure of the embodiment will now be described. Of the connecting bus bar 12, the thickness B1 of the negative weld plate section 27a to be welded to the closed end of the bottomed cylinder 13 is smaller than the thickness A1 of the closed end of the bottomed cylinder 13. Of the connecting bus bar 12, the thickness B2 of the positive weld plate section 28a to be welded to the seal plate 14 of the cell electric 11 is smaller than the thickness A2 of the seal plate 14. Therefore, even when external force which would pull the connecting bus bar 12 out of the electric cell 11 is exerted to the connecting bus bar 12, the connecting bus bar 12 is more susceptible to fractures, thereby preventing infliction of damages to the electric cell 11.

The connecting bus bar 12, which excludes the negative weld plate section 27a and the positive weld plate section 28a, is formed so as to become greater in thickness than a thinner one of the closed end of the bottomed cylinder 13 and the seal plate 14; i.e., the thickness A1 of the closed end of the bottomed cylinder in the embodiment. Therefore, the connecting bus bar 12 exclusive of the area to be welded to the electric cell 11 has become comparatively thick, thereby suppressing the electric resistance of the connecting bus bar 12 to a comparatively small level. Even when a large amount of current is charged or discharged from the electric cells, a drop in voltage at the connecting ring becomes large. An attempt can be made to suppress voltage drop developing in the connecting bus bar to a low level, to thus increase output. In addition, an attempt can be made to avoid heat development in the connecting bus bar, thereby prolonging the lives of the electric cells.

Moreover, the connecting bus bar 12 is integrally formed by comprising the negative opposing section 27, the positive opposing section 28, and the coupling section 29. Hence, an attempt is made to reduce costs by avoiding an increase in the number of components and areas to be welded, thereby reducing the weight of the connecting bus bar 12.

The projections 32 . . . , 33 . . . for protrusive welding purpose are protrusively provided on the negative weld plate sections 27a and the positive weld plate sections 28a, respectively. Hence, a stable welding characteristic can be ensured during protrusive welding of the connecting bus bar 12 to the electric cells 11, whereby electric resistance of a connecting portion between the connecting bus bar 12 and the electric cell 11 can be suppressed to a low level.

At the ends of the first and second electric cell rows R1, R2 in the electric cell module, the electric cells 11 of the first electric cell row R1 and the electric cells 11 of the second electric cell row R2 are arranged in parallel to each other such that the closed ends of the bottomed cylinders 13 and the seal plates 14 are directed oppositely. The coupling section 29 of the connecting bus bar 12 is formed so as to become smaller in thickness than the negative opposing section 27 exclusive of the negative weld plate section 27a and the positive opposing section 28 exclusive of the positive weld plate section 28a. Even when external force which would pull off the connecting bus bar 12 from the electric cells 11 is applied to the connecting bus bar 12, the coupling section 29 is made more readily deformed to absorb the stress. Thus, occurrence of a fracture in the connecting bus bar 12 and the connecting section between the electric cells 11, 11 can be prevented effectively. Moreover, the coupling section 29 is formed into a substantially-U-shaped form protruding in a direction opposite the electric cells 11, 11. The coupling section 29 is made more readily deformed, thereby effectively absorbing stress and more effectively preventing occurrence of fractures in the connecting bus bar 12 and the connecting sections between the electric cells 11, 11.

Embodiments of the invention have been described heretofore; however, the invention is not limited thereto, and the design of the invention can be modified in various ways without departing from the scope of the invention as set forth in the appended claims.

Hereinafter, the second embodiments of the present invention will be described by reference to the accompanied drawings.

Figure 7:
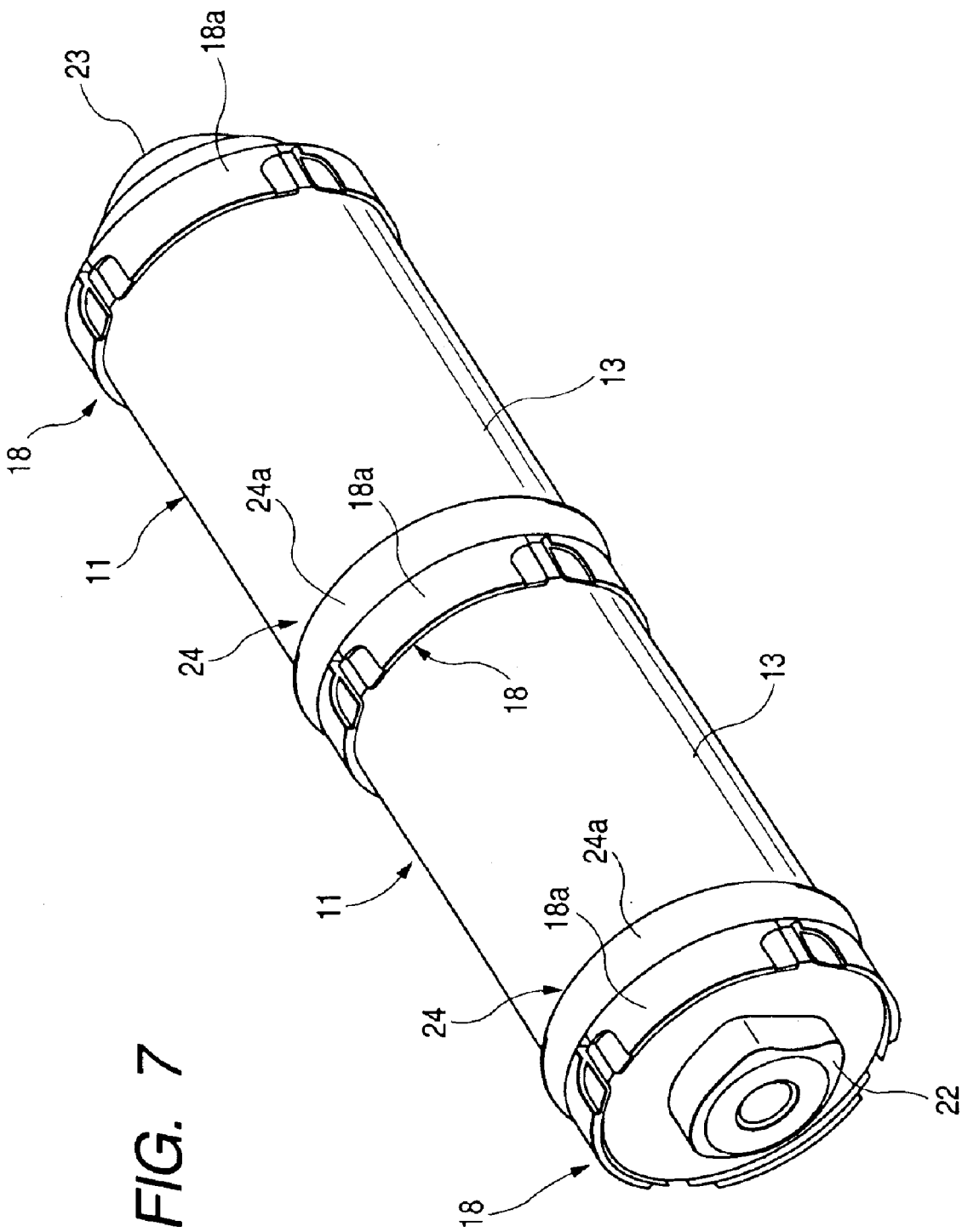
FIG. 7 is a perspective view of an electric cell module of a first embodiment.
Figure 8:
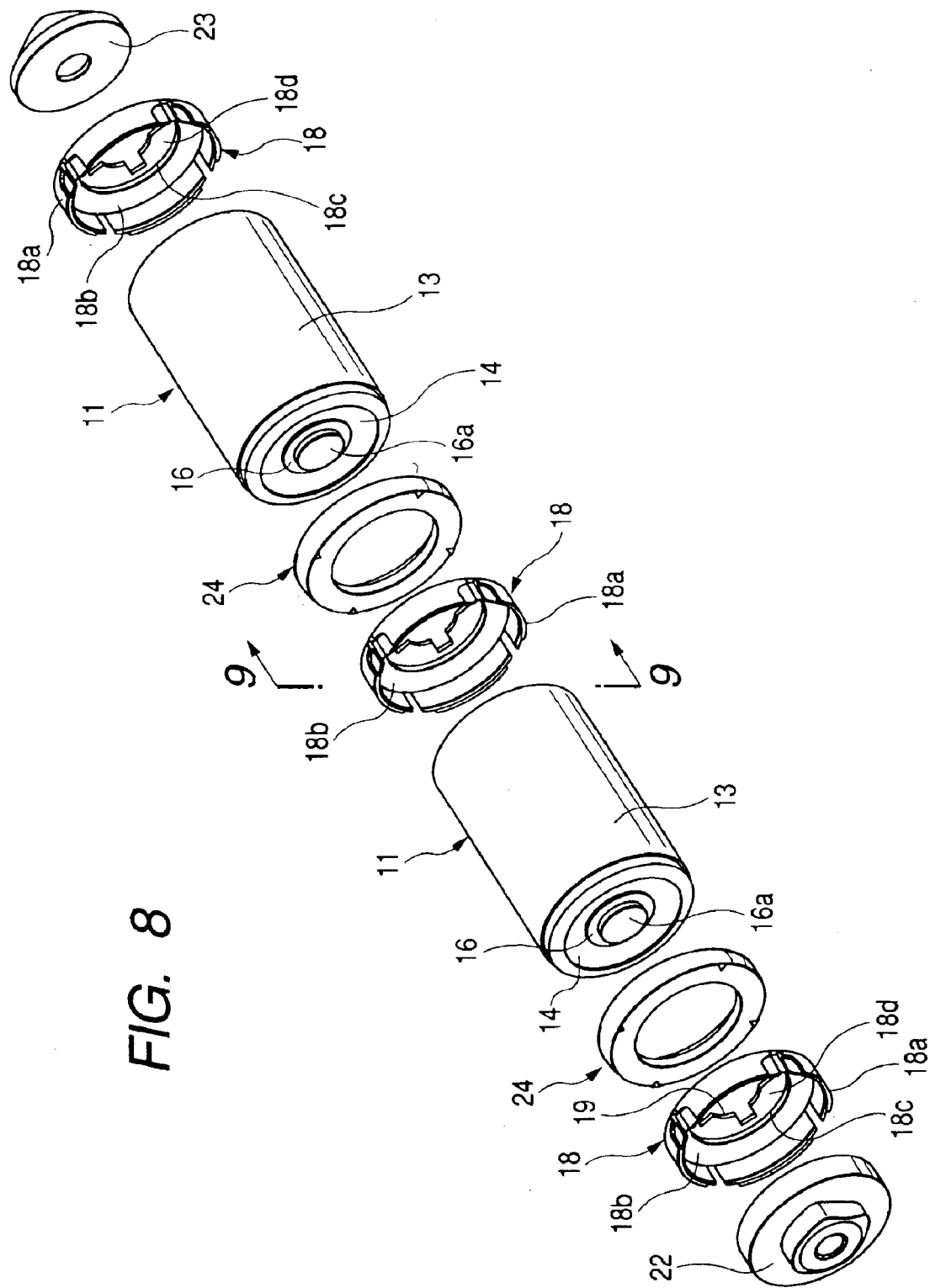
FIG. 8 is an exploded perspective view of the electric cell module.
Figure 9:
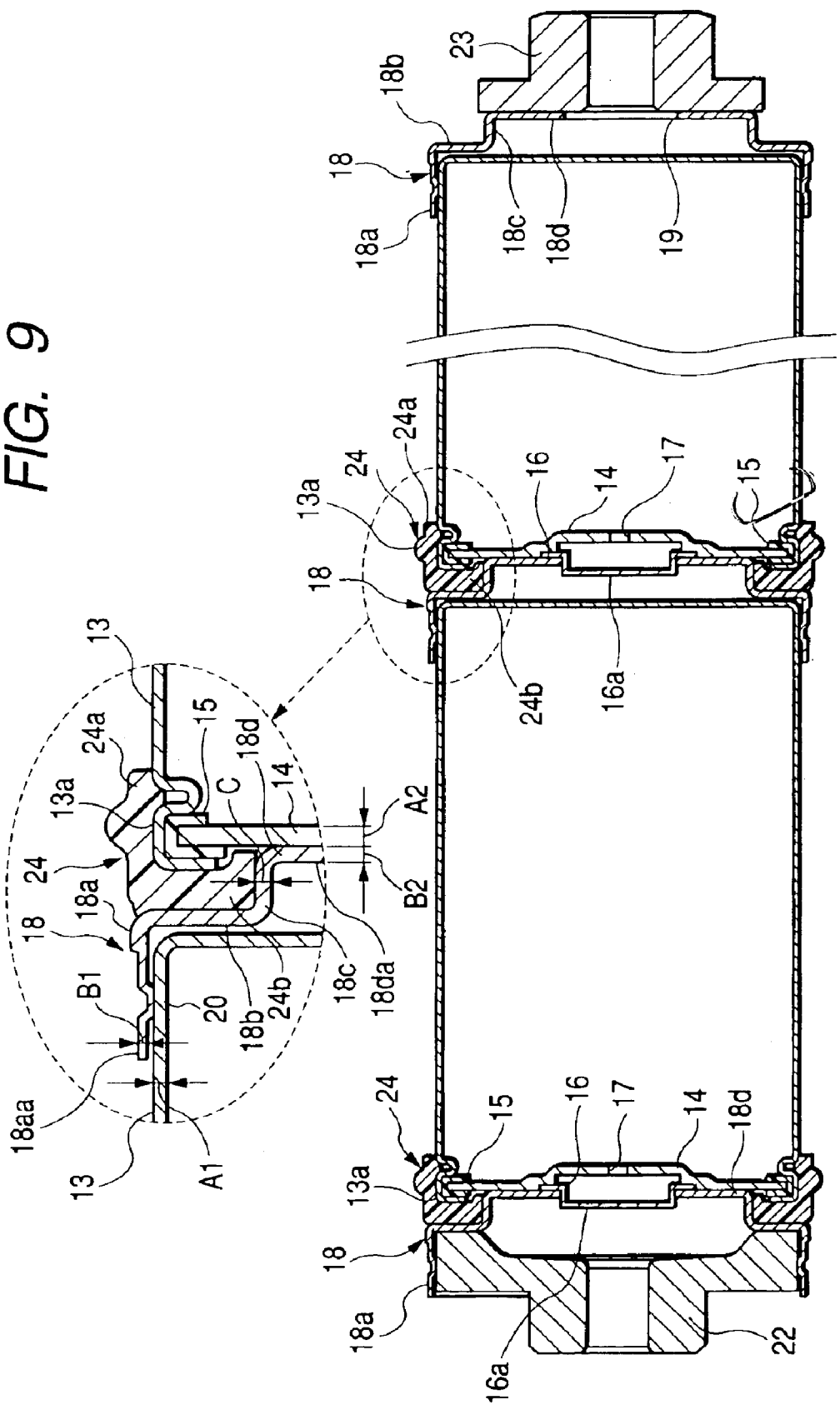
FIG. 9 is a longitudinal cross-sectional view of the electric cell module.
Figure 10:
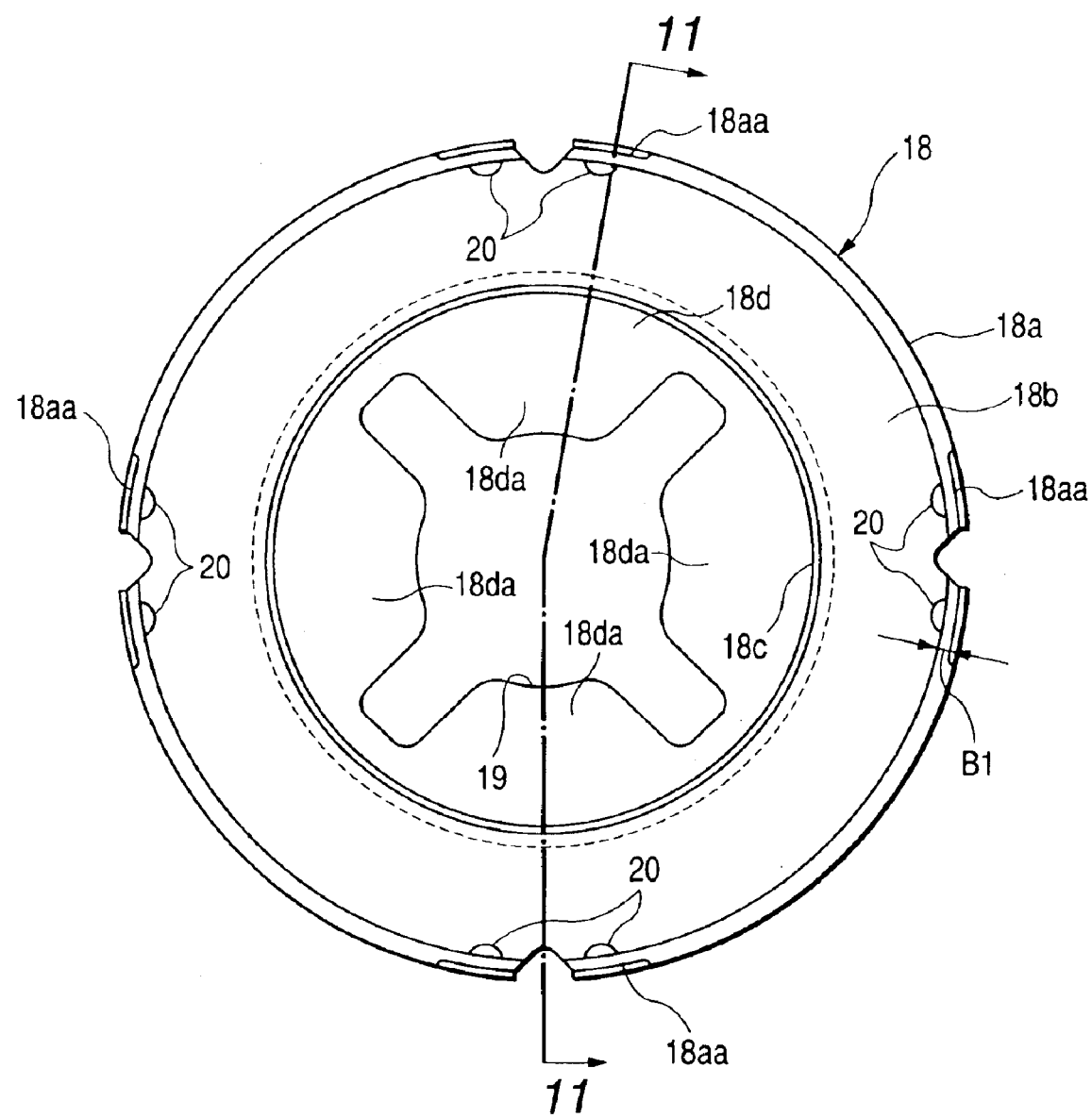
FIG. 10 is a front view of a connecting ring viewed from the direction of arrows at line 4—4 of FIG. 8.

FIGS. 7 to 13 illustrate a first embodiment of the present invention. FIG. 7 is a perspective view of an electric cell module. FIG. 8 is an exploded perspective view of the electric cell module. FIG. 9 is a longitudinal cross-sectional view of the electric cell module. FIG. 10 is a front view of a connecting ring when viewed from the direction of line 4—4 in FIG. 8. FIG. 5 is a cross-sectional view taken along line 5—5 in FIG. 10.

First, reference is made to FIGS. 7 to 9. The electric cell module is configured while a pair of electric cells 11, 11 are connected in series with each other. The electric cell module is preferably used as a power source of an electric vehicle or a fuel-cell-powered vehicle which requires a high level of power, or as a power source of a power tool.

Each of the electric cells 11 comprises a bottomed cylinder 13 of a negative electrode formed in uniform wall thickness so as to assume the shape of a bottomed cylinder; and a seal plate 14 of a positive electrode attached to an open end of the bottomed cylinder 13 with an insulating seal ring 15 of an insulating member interposed therebetween. The bottomed cylinder 13 is made of a conductive metal; e.g., copper, and an annular bead section 13a is formed on the open end portion thereof. The seal plate 14 is made of a conductive metal; e.g., copper, and is attached to the open end portion of the bottomed cylinder 13 such that the insulating seal ring 15 is fitted into the annular bead section 13a, to thus seal the open end of the bottomed cylinder 13. A lid plate 16 made of a conductive metal having a circular protruding section 16a, which serves as a positive terminal when the electric cell 11 is used solely, is welded so as to seal a through hole 17 provided in the center of the seal plate 14. Meanwhile, an internal structure of the electric cell 11 is omitted from FIG. 9.

The two electric cells 11, 11 are connected to each other while sandwiching a connecting ring 18 made of a conductive metal; e.g., copper. The connecting ring 18 is welded to the bottomed cylinder 13 of one of the electric cells and connected to the seal plate 14 of the other electric cell 11.

Figure 11:
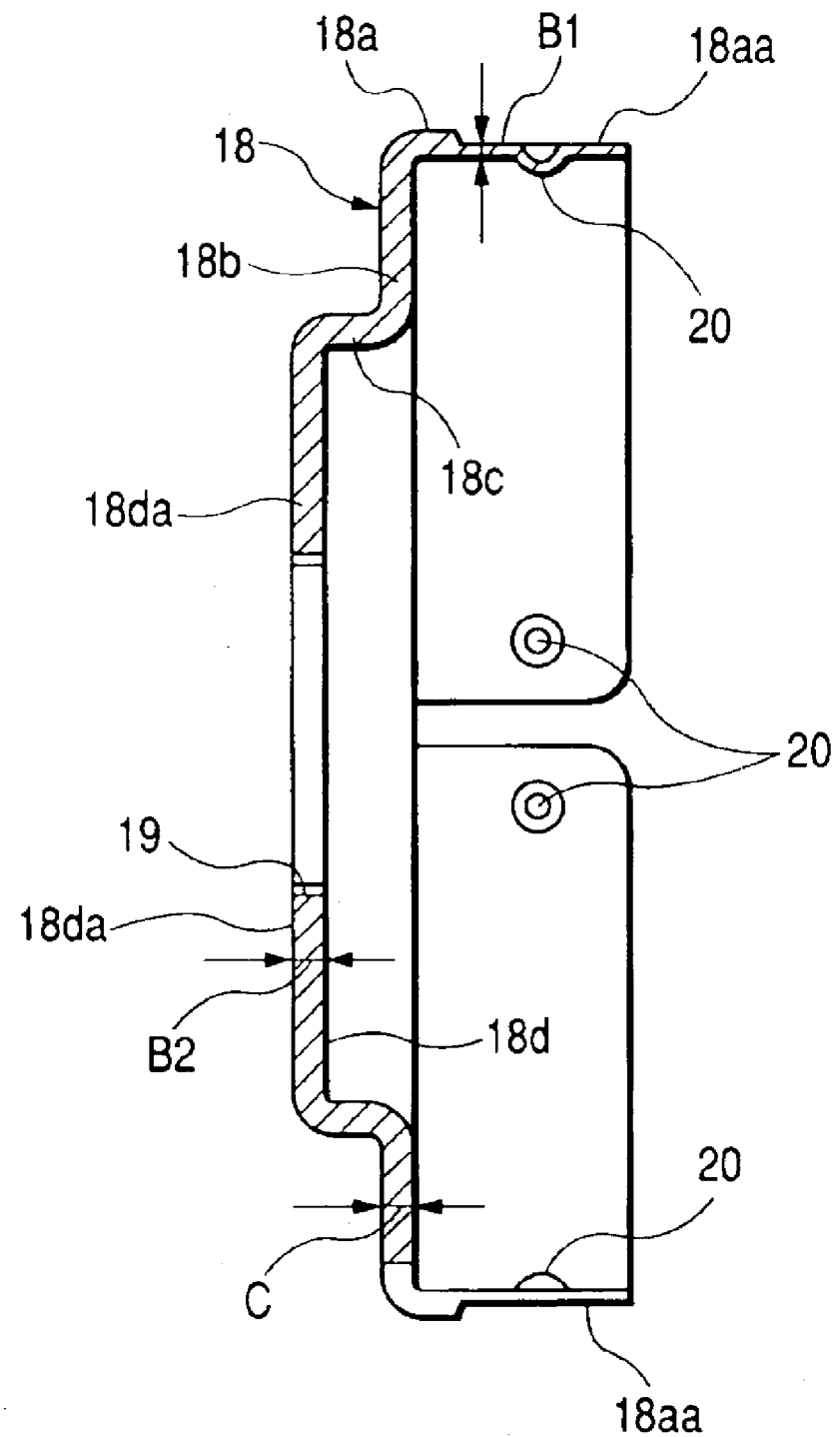
FIG. 11 is a cross-sectional view taken along line 5—5 in FIG. 10.

FIGS. 10 and 11 are referred to in combination. The connecting ring 18 integrally comprises a large-diameter short cylindrical section 18a which is shaped into a cylinder having one open end, fitted over, and welded to a surface of an outer periphery of the bottomed cylinder 13; a first flange section 18b which extends radially inward from the other end of the large-diameter short cylindrical section 18a and which is brought into close contact on an outer surface of a closed end of the bottomed cylinder 13; a small-diameter short cylindrical section 18c whose one end is connected to an inner periphery of the first flange section 18b and which extends in the direction opposite the large-diameter short cylindrical section 18a; and a second flange section 18d which extends radially inward from the other end of the small-diameter short cylindrical section 18c and which is welded to the seal plate 14. The inner periphery of the second flange section 18d forms an insertion through hole 19 which allows insertion through of the circular protruding section 16a protruding from the seal plate 14.

Weld sections 18aa . . . to be welded to the bottomed cylinder 13 are disposed at a plurality of points arranged in a circumferential direction of the large-diameter short cylindrical section 18a; e.g., at four points spaced at equal intervals in a circumferential direction. Weld sections 18da . . . to be welded to the seal plate 14 are disposed at a plurality of points arranged in a circumferential direction of the second flange section 18d; e.g., at four points spaced at equal intervals in a circumferential direction. Further, the wall thickness of at least the weld sections 18aa . . . of the large-diameter short cylindrical section 18a is set to be smaller than a wall thickness A1 of the bottomed cylinder 13; e.g., 0.5 mm. In the first embodiment, the partially-thin weld sections 18aa . . . are formed so as to have a wall thickness B1; e.g., 0.4 mm, which is smaller than the wall thickness A1 of the bottomed cylinder 13 (B1<A1). Furthermore, the wall thickness of at least the weld sections 18da . . . of the second flange section 18d is set to be smaller than the wall thickness A1 of the seal plate 14; e.g., 1.0 mm. In the first embodiment, the entire second flange section 18d inclusive of the weld sections 18da . . . is formed so as to have a wall thickness B2; e.g., 0.8 mm, which is smaller than a wall thickness A2 of the seal plate 14 (B2<A2).

The connecting ring 18, which exclude the weld sections 18aa . . . of the large-diameter-short-cylinder section 18a and the weld sections 18da . . . of the second flange section 18d, is set to be equal or larger in wall thickness to or than thicker sections of the weld sections 18aa . . . and the weld sections 18da . . . . More specifically, in the first embodiment, the wall thickness B2 of the weld sections 18da . . . of the second flange section 18d is smaller than the wall thickness B1 of the weld sections 18aa. . . of the large-diameter short cylindrical section 18a. Therefore, a wall thickness of the connecting ring 18 exclusive of the weld sections 18aa . . . and 18da . . . is set to be equal to or larger than the thickness B2 of the weld sections 18da . . . .

Accordingly, a wall thickness C of the first flange section 18b and the small-diameter short cylindrical section 18c of the connecting ring 18 is equal to or larger than the thickness B2 of the weld sections 18da . . . ; for example, 1.0 mm. A wall thickness of the large-diameter short cylindrical section 18a exclusive of the weld sections 18aa . . . is equal to or greater than the thickness B2; for example, 1.0 mm. A wall thickness of the second flange section 18d exclusive of the weld sections 18da . . . is equal to the thickness B2; for example 0.8 mm.

Projections 20; for example, a projection pair 20, 20 is disposed at each weld section 18aa . . . for effecting projection welding of the weld sections 18aa . . . onto a surface of an outer periphery of the bottomed cylinder 13 in a protruding manner.

Meanwhile, a positive terminal 22 is fitted into and welded to the large-diameter-short-cylinder section 18a of the connecting ring 18, wherein the second flange section 18d is welded to the seal plate 14 of the electric cell 11 at one end with respect to a direction in which the electric cells are aligned (hereinafter called an "alignment direction"). A negative terminal 23 is welded to the second flange section 18d of the connecting ring 18, and the bottomed cylinder 13 of the electric cell 11 on the other end side in the alignment direction is fitted into and welded to the large-diameter short cylindrical section 18a.

An insulating ring 24 is sandwiched between the two electric cells 11, 11, and performs the function of preventing occurrence of a short circuit between the positive and negative terminals of the adjacent electric cells 11, 11, and reinforcing a connecting section between the adjacent electric cells 11, 11. The insulating ring 20 is formed from synthetic resin by integrally comprising a cylindrical section 24a for allowing an outer periphery of the open end portion of the bottomed cylinder 13 to fit therein; and a fitting flange section 24b extending radially inward from the cylindrical section 24a so as to be fitted between the first flange section 18b of the connecting ring 18 and the open end portion of the bottomed cylinder 13.

Further, the insulating ring 24 is also attached on the outer periphery of the open end portion of the bottomed cylinder 13 of the electric cell 11 on one end side in the alignment direction in such a manner that the fitting flange section 24b is allowed to fit between the first flange section 18b of the connecting ring 18 and the open end portion of the bottomed cylinder 13, wherein the second flange section 18d is welded to the seal plate 14 of the electric cell 11 on one end side in the alignment direction.

Next, effects of the first embodiment will be described. Of the connecting ring 18, at least the weld sections 18aa . . . of the large-diameter-short-cylinder section 18a to be welded to the bottomed cylinder 13; i.e., the weld sections 18aa . . . in the first embodiment, are formed so as to be thinner than the bottomed cylinder 13. At least the weld sections 18da . . . , which comprise the entire second flange section 18d in the first embodiment, of the second flange section 18d of the connecting ring 18—which are to be welded to the seal plate 14—are formed so as to be thinner than the seal plate 14. Accordingly, even when an external force is applied in such a manner as to pull off the connecting ring 18 from the electric cells 11, 11, the connecting ring 18 side is made more susceptible to damage, thereby avoiding damage to the electric cell 11.

The connecting ring 18 exclusive of the weld sections 18aa . . . of the large-diameter short cylindrical section 18a and the weld sections 18da . . . of the second flange section 18d is formed so as to have a thickness greater than that of the thicker one of the weld sections 18aa . . . and 18da . . . ; that is, the thickness B2 of the weld sections 18da . . . of the second flange section 18d in the first embodiment. Accordingly, a thickness of the connecting ring 18 exclusive of the weld sections to the electric cells 11, 11 is relatively thick, and electric resistance of the connecting ring 18 can be suppressed to a relatively low level. As a result, when a large amount of current is charged or discharged from the electric cells 11, 11, a voltage drop at the connecting ring 18 is suppressed to a low level, to thus increase output, and to avoid heat development at the connecting ring 18, thereby prolonging the lives of the electric cells 11, 11.

The projections 20 . . . for projection welding are provided on the weld sections 18aa . . . of the large-diameter short cylindrical section 18a of the connecting ring 18. Accordingly, weld stability during projection welding of the connecting ring 18 to the electric cell 11 can be secured, whereby electric resistance of a connecting portion between the connecting ring 18 and the electric cell 11 can be suppressed to a low level.

Figure 12:
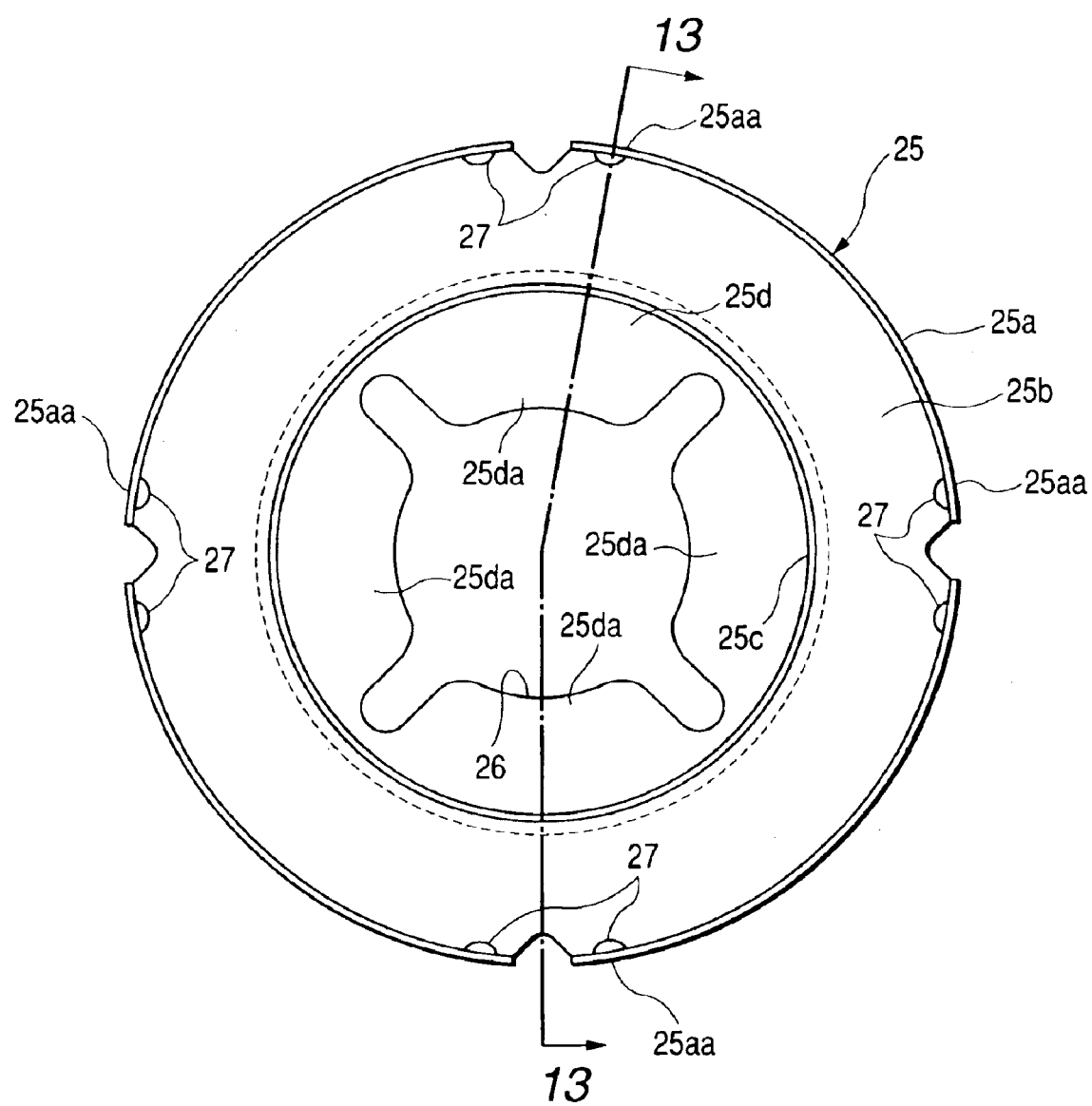
FIG. 12 is a front view of a connecting ring corresponding to FIG. 10.
Figure 13:
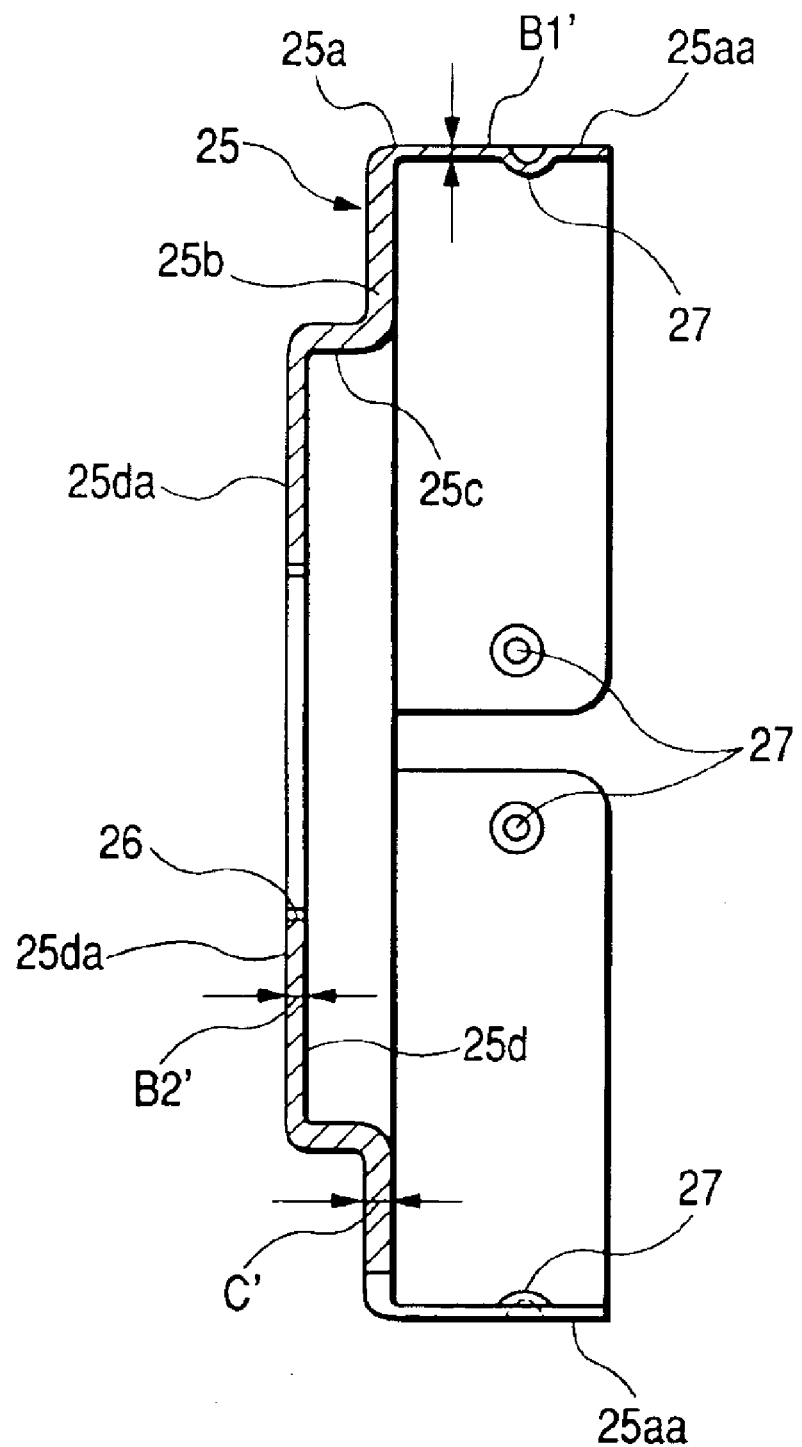
FIG. 13 is a cross-sectional view taken along line 7—7 in FIG. 12.

FIGS. 12 and 13 illustrate a third embodiment of the present invention. FIG. 12 is a front view of a connecting ring 25 corresponding to FIG. 10. FIG. 13 is a cross-sectional view taken along line 7—7 of FIG. 12.

The connecting ring 25 integrally includes a large-diameter short cylindrical section 25a, a first flange section 25b, a small-diameter short cylindrical section 25c, and a second flange section 25d. The large-diameter short cylinder section 25a is shaped into a cylinder having one open end, and is fitted over and welded to a surface of an outer periphery of the bottomed cylinder 13 (see the first embodiment). The first flange section 25b extends radially inward from the other end of the large-diameter short cylindrical section 25a and comes into close contact with an outer surface of a closed end of the bottomed cylinder 13. The small-diameter short cylindrical section 25c having one open end is connected to an inner periphery of the first flange section 25b, extends in the direction opposite the large-diameter short cylindrical section 25a. The second flange section 25d extends radially inward from the other end of the small-diameter short cylindrical section 25c, and is welded to the seal plate 14 (see the first embodiment). The inner periphery of the second flange section 25d forms an insertion through hole 26 which allows insertion therethrough of the circular protruding section 16a (see the first embodiment) protruding from the seal plate 14.

Weld sections 25aa . . . to be welded to the bottomed cylinder 13 are disposed at a plurality of points arranged in a circumferential direction of the large-diameter short cylindrical section 25a; e.g., at four points arranged at equal intervals in a circumferential direction. Weld sections 25da . . . to be welded to the seal plate 14 are disposed at a plurality of points arranged in a circumferential direction of the second flange section 25d; e.g., at four points arranged at equal intervals in a circumferential direction. Further, at least the weld sections 25aa . . . of the large-diameter short cylindrical section 25a are set to be smaller in wall thickness than a wall thickness A1 of the bottomed cylinder 13; e.g., 0.5 mm. In the second embodiment, the large-diameter short cylindrical section 25a—which is to be of uniform wall thickness over the entire area inclusive of the weld sections 25aa . . . —is set to have a wall thickness B1' which is smaller than the wall thickness A1 of the bottomed cylinder 13; e.g., 0.4 mm (B1'<A1). Furthermore, at least the weld sections 25da . . . of the second flange section 25d are set to be smaller in wall thickness than a wall thickness A2 of the seal plate 14; e.g., 1.0 mm. In the second embodiment, the entire second flange section 25d inclusive of the weld sections 25da . . . is formed so as to have a wall thickness B2'; e.g., 0.4 mm, which is smaller than a wall thickness A2 of the seal plate 14 (B2'<A2).

The connecting ring 25 exclusive of the weld sections 25a . . . of the large-diameter short cylindrical section 25a and the weld sections 25da . . . of the second flange section 25d is set to be equal in wall thickness or greater in wall thickness than the thicker one of the weld sections 25aa . . . and the weld sections 25da . . . . More specifically, in the second embodiment, the wall thickness B2' of the weld sections 25da . . . of the second flange section 25d is equal to the wall thickness B1' of the weld sections 25aa . . . of the large-diameter short cylindrical section 25a. Therefore, the wall thickness of the connecting ring 25 exclusive of the weld sections 25aa . . . and 25da . . . is set to be equal to or greater than the thickness B1' of the weld sections 25aa . . . and the wall thickness B2' of the weld sections 25da . . . .

Accordingly, a wall thickness C' of the first flange section 25b and the small-diameter short cylindrical section 25c of the connecting ring 25 is equal to or greater than the thickness B1' of the weld sections 25aa and B2' of the weld sections 25da . . . ; for example, 1.0 mm. A wall thickness of the large-diameter short cylindrical section 25a exclusive of the weld sections 25aa . . . is equal to the thickness B1'; for example, 0.4 mm. A wall thickness of the second flange section 25d exclusive of the weld sections 25da . . . is equal to the thickness B2'; for example, 0.4 mm.

Projections 27; for example, a projection pair 27, 27 is disposed at each weld section 25aa . . . for effecting projection welding of the weld sections 25aa . . . onto a surface of an outer periphery of the bottomed cylinder 13 in a protruding manner.

The second embodiment can also bring about effects similar to those of the aforementioned first embodiment.

Embodiments of the invention have been described heretofore; however, the invention is not limited thereto, and the design of the invention can be modified in various ways without departing from the scope of the invention as set forth in the appended claims.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An electric-cell connecting structure for connecting a pair of electric cells (11), being disposed in series, which are welded to a closed end of the bottomed cylinder (13) of one of the electrode cells, and to the other seal plates (14) of another electric cell (11), each electric cell having a bottomed cylinder (13) at a negative electrode side, and a seal plate (14) at a positive electrode side which is attached, by way of an insulating member (15), to an open end portion of the bottomed cylinder (13) so as to seal the open end of the bottomed cylinder (13), wherein said connecting bus bar (12) is integrally formed by a negative opposing section (27) which is smaller in plate thickness than that of the closed end of the bottomed cylinder (13) in an arrangement to be opposed each other, said negative opposing section partially including a negative weld plate section (27a) so as to be welded to the closed end of the bottomed cylinder (13); a positive opposing section (28) which is smaller in plate thickness than that of the seal plates (14) in an arrangement to be opposed each other, said positive opposing section partially including a positive weld plate section (28a) so as to be welded to the seal plate (14); and a coupling section (29) for connecting together said negative opposing section (27) and said positive opposing section (28), and further wherein the connecting bus bar (12) is formed such that a part of the connecting bus bar (12), without including said negative weld plate section (27a) and the positive weld plate section (28a), is smaller or equal in thickness than that of any one of sections of said closed end of the bottomed cylinder (13) and the seal plates (14) which has a thinner thickness thereof.

2. The electric-cell connecting structure according to claim 1, wherein said negative weld plate section (27a) and said positive weld plate section (28a) is protrusively provided with projections (32, 33) for protrusive welding purpose.

3. The electric-cell connecting structure according to claim 1 or 2, wherein said coupling section (29) is formed so as to have smaller thickness in comparison of said negative opposing section (27) exclusive of said negative weld plate section (27a) and said positive opposing section (28) exclusive of said positive weld plate section (28a).

4. The electric-cell connecting structure according to claim 3, wherein said coupling section (29) is formed into a substantially-U-shaped form.

5. An electric-cell connecting structure for connecting together, via a connecting ring (18, 25), a pair of electric cells (11) disposed in series with each other, each electric cell having a bottomed cylinder (13) at a negative electrode side, and a seal plate (14) at a positive electrode side which is attached, by way of an insulating member (15), to an open end portion of the bottomed cylinder (13) so as to seal the open end of the bottomed cylinder (13); and the connecting ring integrally comprising a large-diameter short cylindrical section (18a, 25a) which has one cylindrically open and which is to be fitted over and welded to a surface of an outer periphery of the bottomed cylinder (13), a first flange section (18b, 25b) which extends radially inward from the other end of the large-diameter short cylindrical section (18a, 25a) and which opposes an outer surface of a closed end of the bottomed cylinder (13), a small-diameter short cylindrical section (18c, 25c) whose one end is continually connected to an inner periphery of the first flange section (18b, 25b) and which extends in the direction opposite the large-diameter short cylindrical section (18a, 25a), and a second flange section (18d, 25d) which extends radially inward from the other end of the small-diameter short cylindrical section (18c, 25c) and which is welded to seal plate (14), wherein the connecting ring (18, 25), whose at least weld sections (18aa, 25aa) of the large-diameter short cylindrical section (18a, 25a) to be welded to the bottomed cylinder (13) are made thinner than the bottomed cylinder (13) and whose at least weld sections (18da, 25da) of the second flange section (18d, 25d) to be welded to the seal plate (14) are made thinner than the seal plate (14), is formed in such a manner that the connecting ring (18, 25), excluding said weld sections (18aa, 25aa) of the cylindrical section (18a, 25a) and the weld sections (18da, 25da) of the second flange section (18d, 25d), is greater or equal in wall thickness than or to thicker sections of said weld sections (18aa, 25aa; 18da, 25da).

6. The electric-cell connecting structure according to claim 5, wherein said weld sections (18aa, 25aa) of the cylindrical section (18a, 25a) further comprise projections (20, 27) for projection welding purpose provided protrusively.

* * * * *